(12) United States Patent
Jin et al.

(10) Patent No.: US 7,866,857 B2
(45) Date of Patent: Jan. 11, 2011

(54) DISPLAY DEVICE

(75) Inventors: Ji-Ying Jin, Shenzhen (CN); Chuang Yue, Shenzhen (CN); Hong-Yi Tao, Shenzhen (CN); En-Long Hao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/495,660

(22) Filed: Jun. 30, 2009

(65) Prior Publication Data

US 2010/0149812 A1 Jun. 17, 2010

(30) Foreign Application Priority Data

Dec. 11, 2008 (CN) .......................... 2008 1 0306187

(51) Int. Cl.
*F21V 21/00* (2006.01)

(52) U.S. Cl. ........................ 362/372; 362/253; 362/287; 362/269; 362/427; 362/428

(58) Field of Classification Search .................. 362/372
See application file for complete search history.

(56) References Cited

U.S. PATENT DOCUMENTS

| | | | |
|---|---|---|---|
| 2002/0085371 A1* | 7/2002 | Katayama et al. | 362/85 |
| 2007/0103918 A1* | 5/2007 | Lin | 362/427 |
| 2008/0266865 A1* | 10/2008 | Lev et al. | 362/287 |
| 2009/0141495 A1* | 6/2009 | Lin | 362/253 |

\* cited by examiner

*Primary Examiner*—Laura Tso
(74) *Attorney, Agent, or Firm*—Zhigang Ma

(57) ABSTRACT

A display device having an illumination device is provided. The display device includes a display, a body, and an illumination device. The display and the illumination device are mounted on the front surface of the body. A receiving space is defined in the front surface of the body and below the display. The illumination device is received in the receiving space and is pivotally connected to the body.

6 Claims, 3 Drawing Sheets

DISPLAY DEVICE

BACKGROUND

1. Technical Field

The disclosure relates to a display device having an illumination device.

2. Description of Related Art

When people use computers in places with poor ambient light then they must supply additional light such as a table lamp which requires space and an outlet and is not always convenient.

BRIEF DESCRIPTION OF THE DRAWINGS

The components of the drawings are not necessarily drawn to scale, the emphasis instead being placed upon clearly illustrating the principles of the display device. Moreover, in the drawings, like reference numerals designate corresponding parts throughout several views.

DETAILED DESCRIPTION

Figure 1:
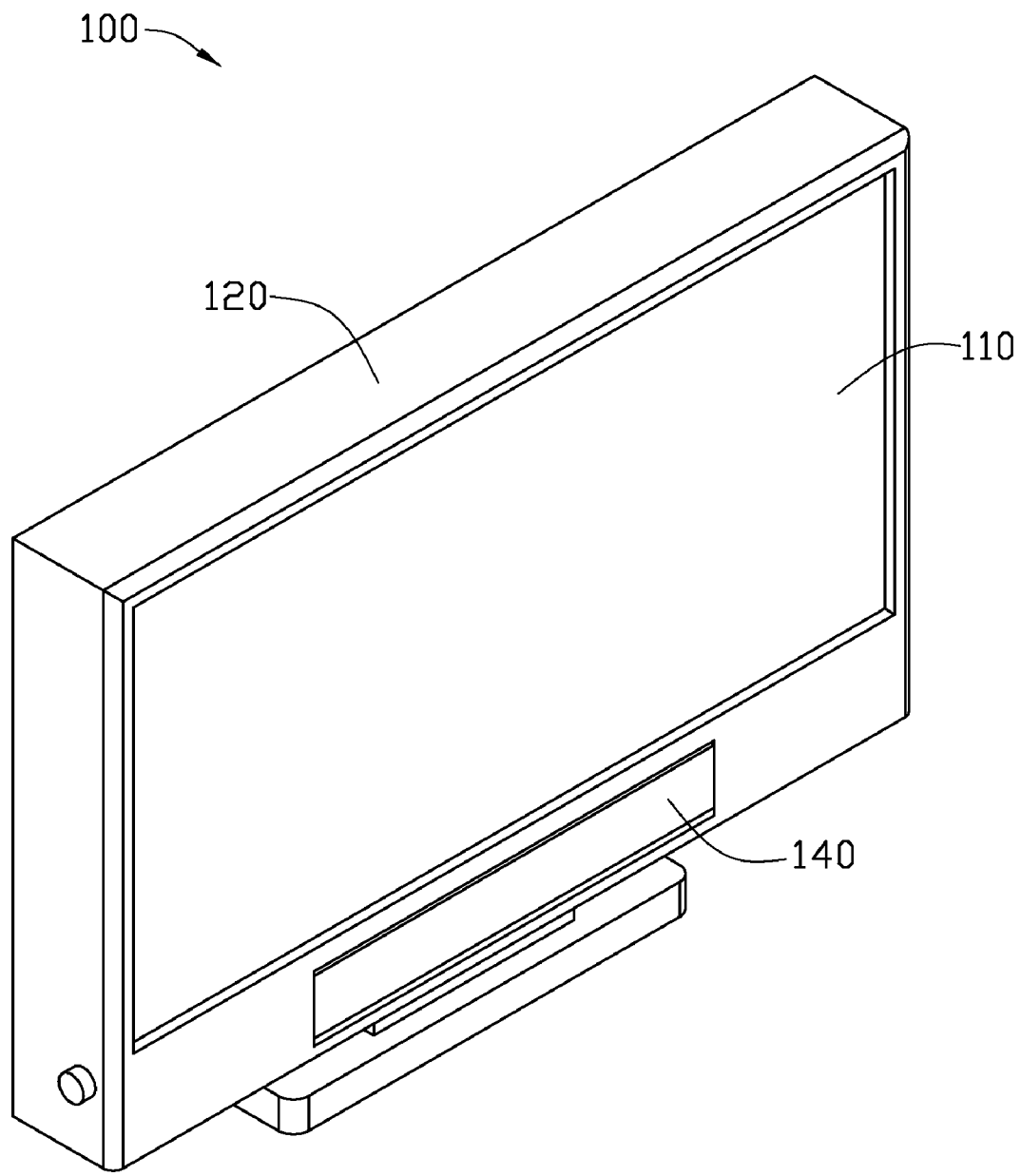
FIG. 1 is an isometric view of a display device having an illumination device in accordance with a preferred embodiment.
Figure 2:
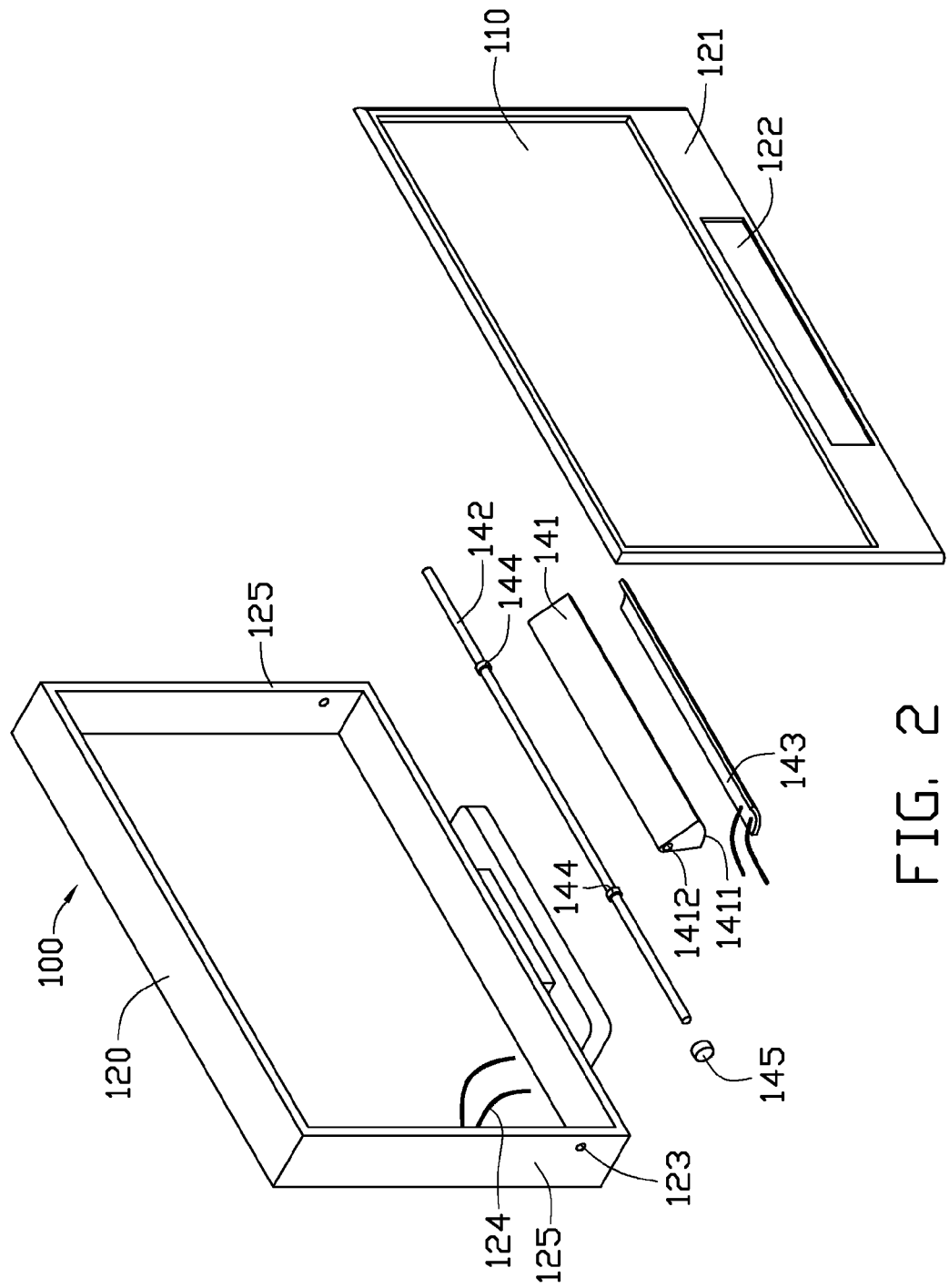
FIG. 2 is an exploded, isometric view of the display device shown in FIG. 1.

FIG. 1 is a display device 100 having an illumination device 140. Referring to FIG. 2 simultaneously, the display device 100 includes a display 110, a body 120, and an illumination device 140, both the display 110 and the illumination device 140 are mounted on a front surface 121 of the body 120. The display 110 is configured for displaying information.

The body 120 includes a circuit board (not shown). Power wires 124 are connected to the circuit board and used for supplying electrical power to the illumination device 140. A receiving space 122 is defined inside a lower part of the body 120 in communication with the exterior through the front surface 121, and is used for accommodating the illumination device 140. The body 120 further includes through holes 123 defined in opposite sidewalls 125, in communication with the receiving space 122.

The illumination device 140 includes a supporting portion 141, a pivot rod 142, a light source 143, two limiting portions 144 on the pivot rod 142, and a knob 145. The supporting portion 141 is an elongated sector and includes a curved surface 1411 and a through fixing hole 1412. The pivot rod 142 can be fixed to the supporting portion 141 through the through fixing hole 1412, and can be pivotally connected to the body 120 via the through holes 123. At least one end of the pivot rod 142 can extend outside of the body 120. The light source 143 is attached to the curved surface 1411. The knob 145 is engagable with the pivot rod 142 at the end thereof extended outside of the body 120.

In assembly, firstly, the light source 143 is attached to the curved surface 1411 and is connected to the circuit board through the power wires 124; secondly, the pivot rod 142 is extended through the through hole 123 in the left sidewall 125, the limiting portions 144, the fixing hole 1412, and the other through hole 123 in turn; then, the limiting portions 144 are adjusted so that a preferred length of the pivot rod 142 is extended outside of the body 120 to engage with the knob 145, at the same time, the illumination device 140 is adjusted to a preferred position so as to be exposed and unexposed while the pivot rod 142 is rotated relative to the body 120; finally, the knob 145 is engaged with the pivot rod 142 at the end thereof outside of the body 120.

Figure 3:
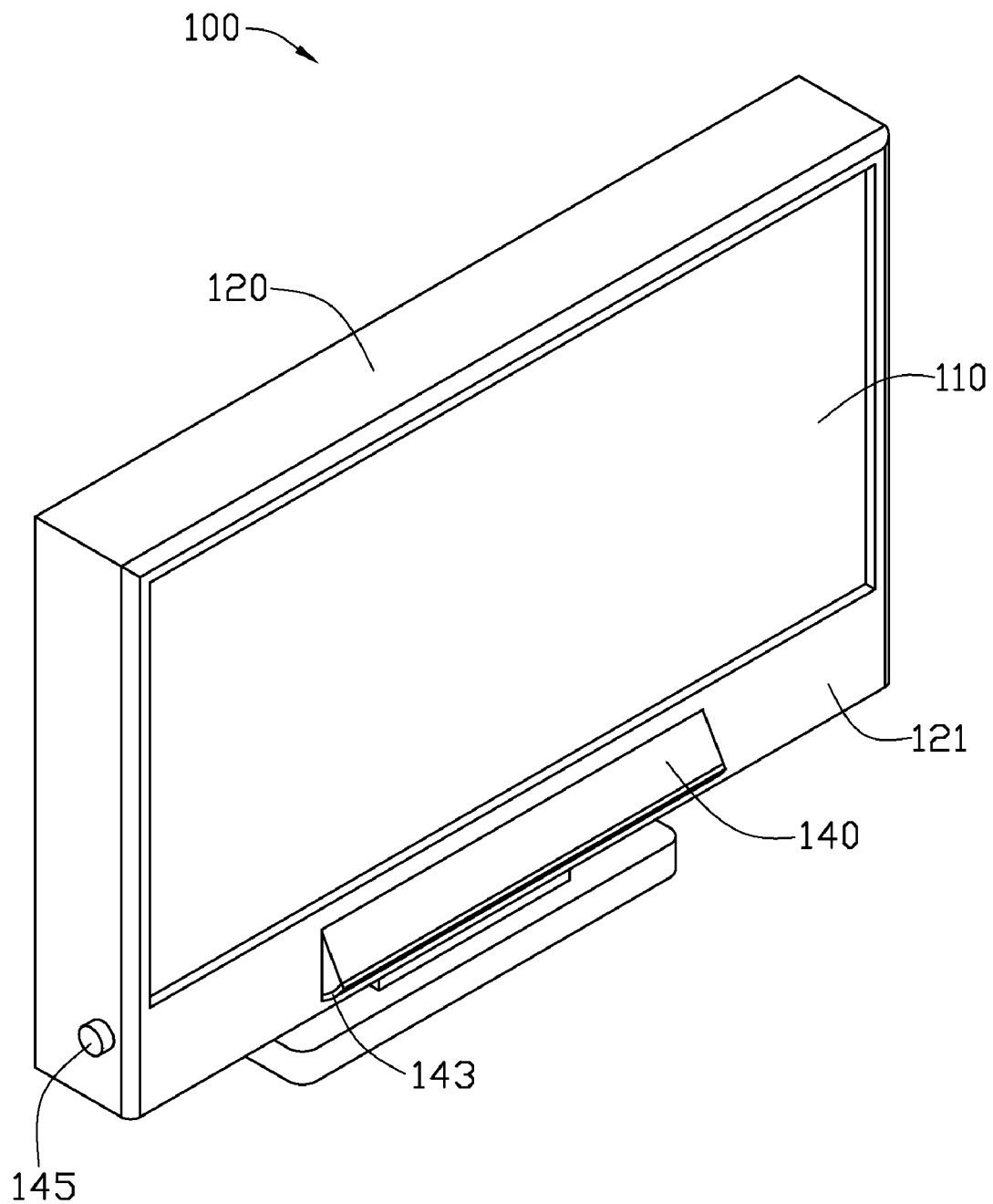
FIG. 3 is an isometric view of the display device of FIG. 1 while the illumination device is exposed.

After assembly, referring to FIG. 3, the light source 143 and the supporting portion 141 are fixed on the pivot rod 142 and further received in the receiving space 122, the pivot rod 142 is pivotally connected to the body 120, therefore, when the pivot rod 142 is rotated, the supporting portion 141 and the light source 143 are driven to rotate relative to the body 120, a part or all of the light source 143 is exposed outside of the body 120 according to rotating operation by the users. Furthermore, while the users do not further rotate the knob 145, the illumination device 140 is kept in a preferred position.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A display device, comprising:
   a display;
   a body defining a receiving space; and
   an illumination device received in the receiving space, comprising a supporting portion and a light source;
   wherein the light source is attached to the supporting portion, the supporting portion is pivotally connected to the body and is configured for exposing and hiding the light source while being rotated;
   wherein the illumination device further comprises a pivot rod fixed to the supporting portion, the pivot rod is configured for receiving user rotating operations and driving the supporting portion to rotate according to rotating operations by the user.

2. The display device as described in claim 1, wherein the body further comprises a through hole communicating with the receiving space and defined in a sidewall of the body.

3. The display device as described in claim 2, wherein the pivot rod is extended through the through hole and is pivotally connected to the body, a section of the pivot rod is extended outside of the body via the through hole.

4. The display device as described in claim 3, wherein the illumination device further comprises a knob, the knob is engaged with the pivot rod at the end thereof extended outside of the body.

5. The display device as described in claim 1, wherein the illumination device further comprises a limiting portion fixed on the pivot rod, the limiting portion is configured for locking the supporting portion in the pivot rod.

6. The display device as described in claim 1, wherein the supporting portion is an elongated sector and comprises a curved surface, the light source is attached to the curved surface.

* * * * *